United States Patent [19]

Edblad et al.

[11] Patent Number: 5,864,680
[45] Date of Patent: Jan. 26, 1999

[54] METHOD AND SYSTEM FOR DISTRIBUTING DATA IN A REAL TIME DATA IMAGING NETWORK

[75] Inventors: Warren A. Edblad, Plum Boro; Linda L. Santoline, South Park; Gilbert W. Remley, O'Hara Township; Carl J. Staab, Murrysville; Albert W. Crew, Monroeville, all of Pa.

[73] Assignee: Westinghouse Electric Corporation, Pittsburgh, Pa.

[21] Appl. No.: 869,473

[22] Filed: Jun. 5, 1997

Related U.S. Application Data

[63] Continuation of Ser. No. 342,992, Nov. 7, 1994, abandoned, which is a continuation of Ser. No. 901,454, Jun. 19, 1992, abandoned.

[51] Int. Cl.[6] .................................................. G06F 15/173
[52] U.S. Cl. .................... 395/200.72; 345/501; 345/502; 345/504; 345/505; 345/508; 345/511; 345/512; 345/526; 395/200.31; 395/200.6; 395/200.66; 395/200.67; 395/200.78; 395/200.79; 395/200.81; 370/350; 370/352; 370/400; 370/450; 370/452; 370/466; 370/468; 370/469; 370/470
[58] Field of Search ......................... 395/200.03, 200.14, 395/200.17, 200.19, 200.31, 200.6, 200.66–200.67, 200.72, 200.78, 200.81, 200.79; 345/501–502, 504–505, 508, 511–512, 526; 370/352, 400, 450, 466, 452, 468–470, 350

[56] References Cited

U.S. PATENT DOCUMENTS

| | | | |
|---|---|---|---|
| 4,646,290 | 2/1987 | Hills .......................................... 370/84 |
| 4,663,704 | 5/1987 | Jones et al. .............................. 364/188 |
| 4,680,583 | 7/1987 | Grover .................................... 340/825 |
| 4,760,572 | 7/1988 | Tomikawa ................................. 370/94 |
| 4,843,542 | 6/1989 | Dashiell et al. ......................... 711/119 |
| 4,866,704 | 9/1989 | Bergman ................................ 370/85.4 |
| 4,912,703 | 3/1990 | Sumida .................................... 370/58 |
| 4,926,375 | 5/1990 | Mercer et al. ...................... 395/200.31 |
| 5,036,518 | 7/1991 | Tseung ...................................... 371/32 |
| 5,117,350 | 5/1992 | Parrish et al. .......................... 395/425 |
| 5,142,623 | 8/1992 | Staab et al. ............................. 395/200 |
| 5,179,665 | 1/1993 | Roslund et al. ........................ 395/250 |
| 5,282,270 | 1/1994 | Oppenheimer et al. ............... 395/200 |
| 5,297,257 | 3/1994 | Struger et al. .......................... 364/188 |
| 5,305,314 | 4/1994 | Edblad et al. ............................ 370/79 |
| 5,327,468 | 7/1994 | Edblad et al. .......................... 375/107 |
| 5,355,453 | 10/1994 | Row et al. ............................. 395/200.09 |
| 5,384,697 | 1/1995 | Pascucci ................................. 364/139 |

FOREIGN PATENT DOCUMENTS

| | | |
|---|---|---|
| 0303830 A2 | 7/1988 | European Pat. Off. . |
| 2205018 | 11/1988 | United Kingdom . |

OTHER PUBLICATIONS

King, "The Fibre Distributed . . . Local Area Newtorks," 1988 IEEE, pp. 239–242.

Martini et al., "Real–Time Traffic . . . Circuit Switching," 1991 IEEE, pp. 1413–1420.

Strosnider et al., "Advanced Real–Time . . . Token Ring," 1988 IEEE, pp. 42–52.

Mark et al., "A Dual–Ring . . . Data Services," 1990 IEEE, pp. 850–857.

Houser, K. D., "Data Highway Provides Database Management," *Computer Design*, Nov. 1983, 6 pp.

*Primary Examiner*—Tod R. Swann
*Assistant Examiner*—Denise Tran

[57] ABSTRACT

A computer network system repetitively distributes messages including uniquely identified blocks of real time data containing a current data image over a broadcast communications network to all real time stations for storage of each repetition of each entire block of data directly in station memory at a unique address space assigned to that uniquely identified block of data. The real time stations receive the blocks of data and alternatively receive other messages from the real time stations. The other messages have a recognized standard protocol, such as the TCP/IP or UDP/IP protocol of the Internet Protocol Suite.

19 Claims, 7 Drawing Sheets

METHOD AND SYSTEM FOR DISTRIBUTING DATA IN A REAL TIME DATA IMAGING NETWORK

This application is a continuation of application Ser. No. 08/342,992, filed Nov. 7, 1994, now abandoned, which application is a continuation of application Ser. No. 07/901,454 filed Jun. 19, 1992, now abandoned.

BACKGROUND OF THE INVENTION

1. Field of the Invention

This invention relates to sharing of data in a distributed processing system, and more particularly to the transmission, processing and storage of real time data in a network system.

2. Background Information

In most computer networks, data transmitted over a data highway interconnecting the various stations in the network is addressed to a specific station or stations. The message is ignored by the remaining stations on the network. The network interface at the addressed station interrupts the station central processing unit which then processes the message. Often the receiving station sends back an acknowledgment to the sender station. In these systems, the message identifies both the receiving and sending stations. Such a process is efficient in an application with interactive communication needs between stations.

In broadcast multi-cast networks, the messages are not addressed to any specific station. Each station receives all of the data transmitted and traditionally takes what it needs. This also requires processing of the message by the central processing unit of the receiving station. Typically, to reduce the burden on the system, data is only broadcast by exception. That is, only when the value of a piece of data changes is a message sent. Thus, for instance, in a distributed process control system, where various functions are being performed by a number of stations on a network, data is only broadcast when the value of a variable changes. Other deterministic systems, such as automatic teller machines linked to a central unit by a network also only send data when there is a transaction to process. However, such systems can become overburdened if there is a large disturbance in the process being controlled, or a large number of transactions occur simultaneously.

Assignee of the present invention has developed a broadcast network in which data from the various stations are bundled into packets or blocks of data which are transmitted periodically, whether or not the data has changed. Data with a short latency is transmitted at a fast repetition rate, while other data which is less critical or changes at a slower rate, is transmitted at more widely spaced time intervals. In this system, all the data is transmitted repetitively and is received by all of the stations. Each station examines each block of data received and slices off for storage only that data which it needs. This system is designed for the worst case scenario, and thus does not become overwhelmed by large disturbances in the system. However, local processing of each block of data is required to determine the data to be stored in memory at that station, which limits the data rate that can be handled by the system.

There is a need, therefore, for an improved broadcast network system with an enhanced data rate and yet which does not become overwhelmed by the worst case scenario. Additionally, peer-to-peer communications should also be provided without compromising the real-time performance.

SUMMARY OF THE INVENTION

While other systems attempt to improve performance by limiting the data transmitted by the sending station, or limiting the data stored at the receiving station, the present invention takes the novel approach of transmitting all of the real time data to all of the stations requiring real time data, and storing all of the data transmitted at each such station, whether all of the data is needed or not at a specific station. While at first glance this may appear to be inefficient, in reality, through put is improved because minimal processing is required at each end of the transmission. At the sending end, the entire block of data is transmitted. No processing is required to determine what values have changed. At the receiving end no processing is required to determine what data to store.

Rather than identifying each block of data by the sender or receiver station, each block is given a unique identifier. Each receiving station stores subsequent repetitions of each uniquely identified block of data in the same uniquely identified address space at the station. The unique address space is preferably a virtual address space. Also, preferably, virtual address spaces are translated into physical address spaces at the local station by memory management hardware which maintains a list of free pages in memory and inserts the incoming message image in the next available page and then updates the translation of the virtual address space to this new physical location. With this arrangement, the local central processing unit can be accessing the last image of a message while the current message is being stored. This process places minimum burden on the host central processing unit.

Alternatively, in systems without appropriate memory management hardware, a driver routine can be used to maintain a table for virtual to physical address space translation and a separate list for free pages in memory. However, even this alternative places a very small processing load on the local central processing system.

The invention embraces both a system for and method of implementing data transfer in a real time data imaging network.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention is directed to a real time data imaging network system. It has particular application, and will be described as applied to, a distributed process control system. However, it will be appreciated by those skilled in the art that the invention has application to other deterministic network systems with a distributed data base, such as for instance, automated teller machines, video and multi-media mixing networks and others.

Figure 1:
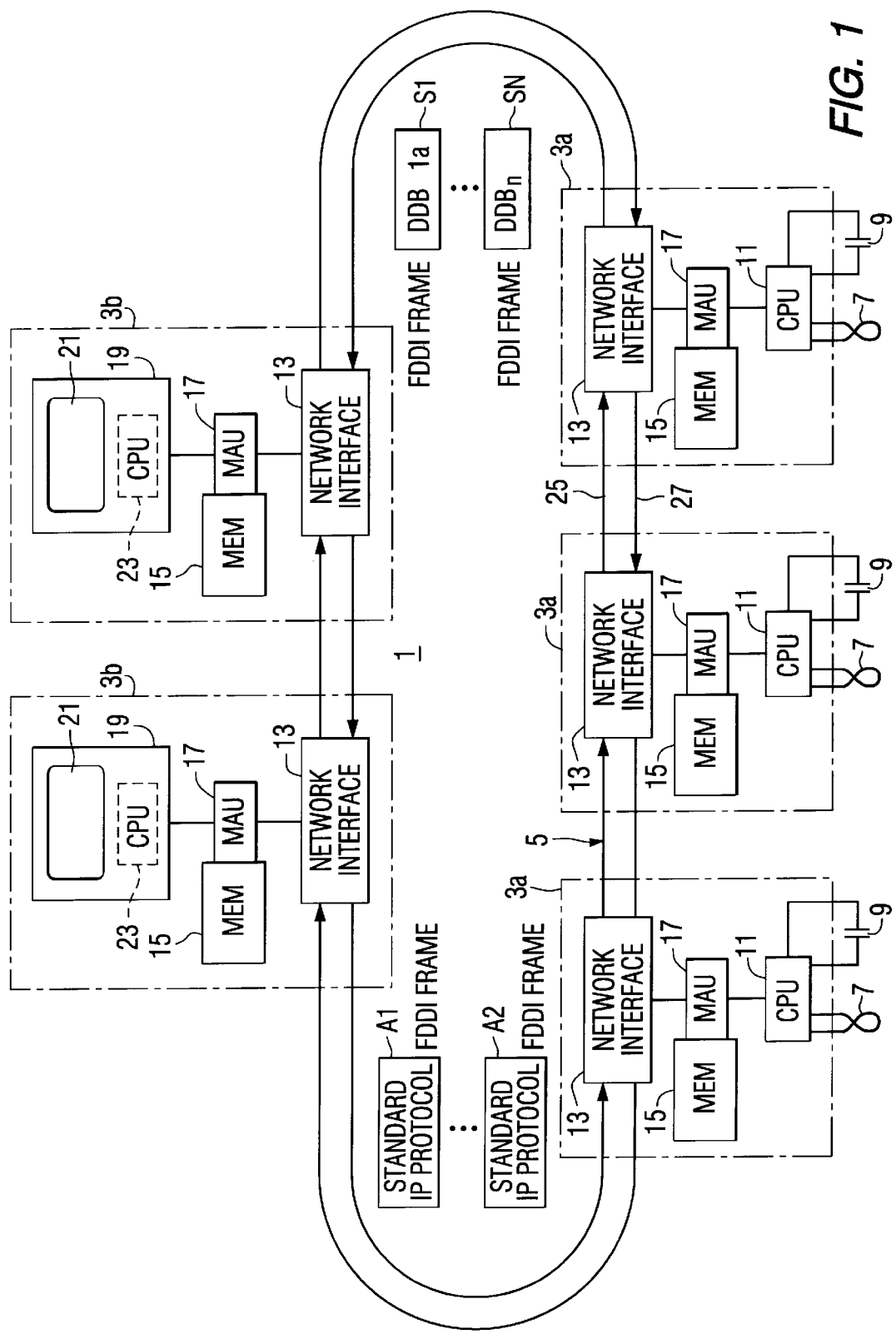
FIG. 1 illustrates schematically a real time data imaging systems in accordance with the invention.

FIG. 1 illustrates a distributed process control system based on the real time imaging network 1. The system 1 comprises a number of stations 3 interconnected by communication network 5. The stations, or "drops", as they are often referred to, include, but are not limited to, data processing units (DPUs) 3a, and man-machine interface units (MMI) 3b. Other drops (not shown) that do not require real time data can be included on the networks. These DPUs 3a are typically connected to physical devices associated with the process to be controlled. The physical devices include: input sensors, such as thermocouples 7, and outputs, such as contacts 9. Each DPU 3a provides control over loops assigned to it by monitoring the operation of each loop and insuring that the values of the pertinent variables are kept to their respective set points. The DPU does this by calling algorithms which scan the input signals from the sensors, such as 7, compare the variable actual value to its set point, perform the calculations necessary to bring the variable values into line with the set point, and output a control signal to a final control device at the process such as the contacts 9 which for instance, may control a valve or a motor, etc. Thus, items in a physical environment such as a coolant level or fuel flow are understood by the control system as data. Information about a process variable is stored in the DPU 3a as a point data record. The information in this data record can be broadcast onto the communications network 5 for other stations or drops to use, or it can be kept internal to the drop to which it is assigned. A point data record contains two distinct types of information. One type is the dynamic information, which is a function of the physical inputs of the drop. An example of dynamic information is the process flow value read from a flow sensor 7. The other type of information is the static information, which includes configuration information and other data which rarely changes. Examples of static information are the conversion constants, alarm limits, and textural descriptions associated with an analog input. While the dynamic information must be broadcast periodically, the static data is broadcast on an "as needed" basis.

The DPUs 3a include a central processing unit (CPU) 11 which receives the input information from the sensor 7, implements the control algorithms, and controls the output devices 9. The DPUs 3a also include a network interface 13 between the CPU 11 and the network 5. The DPUs 3a further include a memory 15 which is shared between the CPU 11 and the network interface 13.

A memory address unit (MAU) 17 provides virtual to physical address mapping for the memory 15 in which data is stored and retrieved. The shared memory 15 and MAU 17 may be physically provided in the CPU 11 or the network interface 13.

The man-machine interface (MMI) stations, or drops, 3b, include a workstation 19 which incorporates a CRT 21 for display of information and a CPU 23. The drops 3b also contain a network interface 13 and shared memory 15 with its MAU 17 which again, can be physically provided in the workstation 19 or the network interface 13.

The communication network 5 includes coaxial, twisted pair, or fiber optic, cables 25 and 27 strung throughout the facility between the stations and configured to provide redundant communication paths. In FIG. 1, this is illustrated as a dual counter-rotating ring.

Each of the drops 3 must be autonomous, that is, it must be capable of functioning without the presence of the communications network 5. This imposes a requirement that the database for the system be distributed. For a DPU 3a, all its configuration data must be stored internally at the drop, so that the DPU can restart and perform its control function without the need for data from any external source. For an MMI 3b, the configuration data must also be stored internally so that the drop can restart. However, since the primary function of an MMI is to serve as a man-machine interface, the workstation requires the presence of the communications network 5 to obtain the process data associated with its display screens.

The preferred communications network highway 5 has an open system architecture conforming to the FDDI (fiber distribution data interchange) standards. The communications network 5 provides both proprietary and general purpose communications. General purpose communication is managed via a recognized standard protocol, such as the TCP/IP or UDP/IP protocol of the Internet Protocol Suite, encapsulated within an FDDI asynchronous message. The general purpose communications protocol is used whenever the performance is adequate. In contrast, the proprietary communications protocol to be described is used to handle message traffic where the data latency requirements prohibit the use of the higher level protocol, such as for dynamic point data communications.

System data elements that are transmitted over the communications network 5 are referred to as network points. Data elements which are local to a drop are referred to as local points. Dynamic data associated with periodic, network points are transmitted periodically at either a SLOW RATE or a FAST RATE. Due to the large number of dynamic data points in a system and the overall through put requirements of the dynamic point data, the software overhead associated with message processing prevents the transmission of dynamic point data associated with periodic, network points as individual messages. For this reason, the dynamic data associated with periodic, network points is bundled into dynamic data blocks (DDBs) for transmission on the highway. A dynamic data block is associated with the drop which originates the points contained within the block, and is referenced by a numerical identifier which is unique throughout the system. Each dynamic data block has a fixed transmission rate (either slow or fast) and a fixed size shared memory area associated with it where it is stored. As periodic, network points are added to each drop 3, they are assigned to a dynamic data block of the correct transmission rate which is originated by that drop. Bounding of the maximum dynamic data latency is critical to the correct operation of the system. For this reason, transmission of dynamic data blocks is handled as synchronous FDDI frames, such as synchronous FDDI FRAME S1 and synchronous FDDI FRAME SN, and is handled by the network interface 13 without intervention from application software. All general purpose communications are handled as asynchronous FDDI frames, such as the standard IP protocol encapsulated in asynchronous FDDI FRAME A1, and in asynchronous FDDI FRAME A2.

Figure 2:
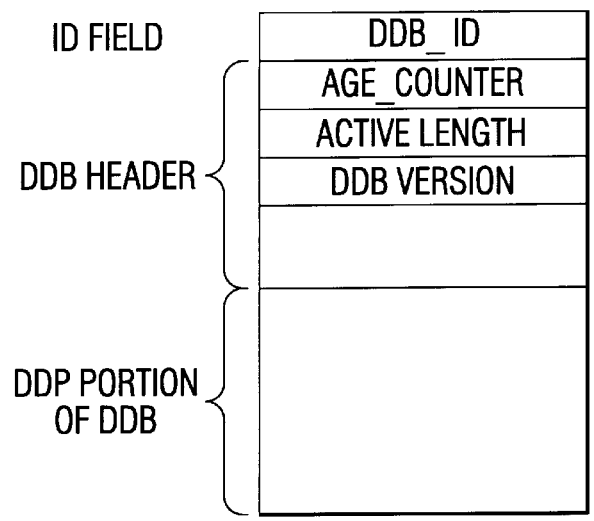
FIG. 2 illustrates the definition of uniquely identified blocks of data which are transmitted throughout the system of FIG. 1 in accordance with the invention.

The definition of a dynamic data block (DDB) 29, is illustrated in FIG. 2. The DDB 29 consists of a field containing a unique identifying index (DDBID), a fixed size header portion used for control and status, and a data portion containing the assigned dynamic data points (DDPs). The header includes an age counter which is a measure of the age of the DDB. The originating station sets the age counter to an age threshold for the DDB. An application process running in each receiving drop periodically decrements this field. If it reaches zero, the block is considered "stale" and will not be used.

The active length portion of the header contains the number of bytes of the DDB containing DDPs, plus the size of the header and ID fields. The version portion of the header is updated whenever DDPs are added, modified, or deleted from the DDB.

A unique feature of the invention is that the dynamic data blocks, DDBs, generated by each real time station are broadcast over the communications network to, and entered in storage in their entirety in, each other real time station. While other broadcast systems have attempted to increase efficiency by reducing through put, this invention actually transmits all data to all real time stations whether they need all the data points or not. The key factor is that this approach requires no, or minimal, processing of the communication by the CPU of the receiving station. This is accomplished by directly storing repetitions of each uniquely identified block of data in a uniquely identified address space in each real time station so that that the uniquely identified address space contains the current, or most recent, image of that block of data. The unique address space is assigned by the local station and does not necessarily have to be the same for each station.

When the uniquely identified dynamic data block is received at a station by the network interface 13, it is distinguished by the network interface from the lower priority messages. The network interface which contains a processor, maintains the list of unique addresses for that station for each of the uniquely identified dynamic data blocks. In a preferred form of the invention, these unique addresses for the uniquely identified dynamic data blocks are virtual addresses, and not absolute physical addresses in the memory 15.

Figure 3:
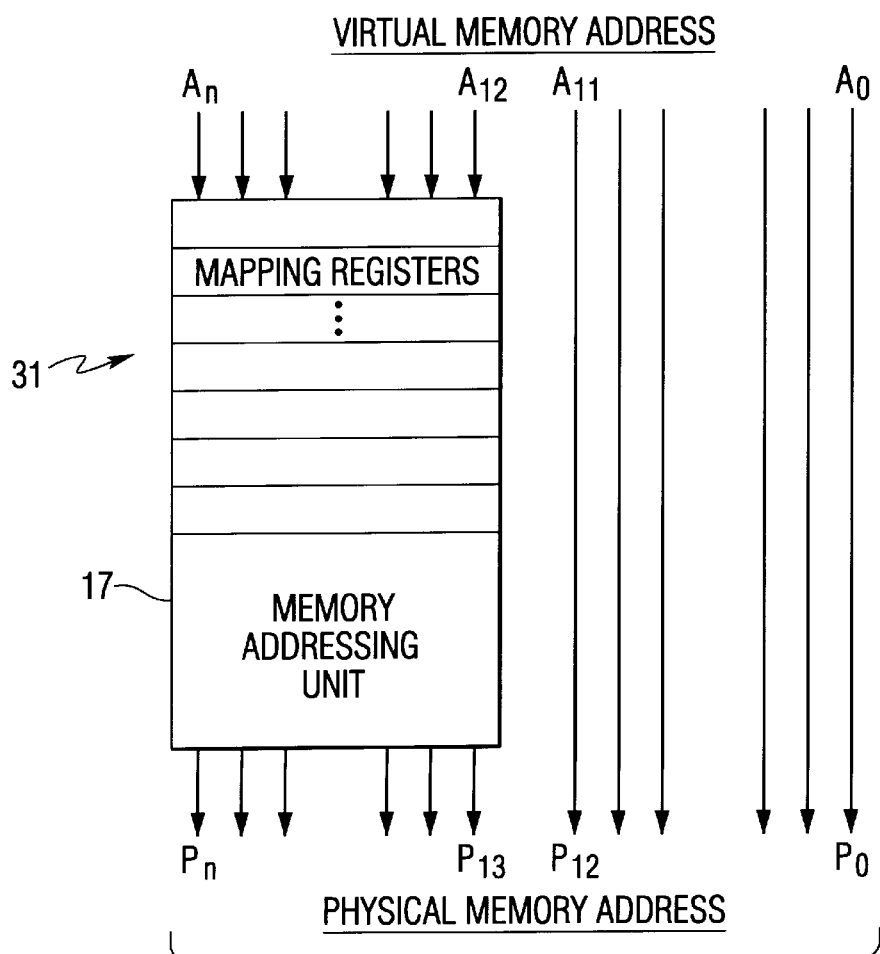
FIG. 3 schematically illustrates the operation of a memory addressing unit, which forms part of the system of FIG. 1, in translating a virtual memory address space into a physical memory address space.

The preferred implementation of the invention minimizes the impact on the host processor by utilizing the memory manager and hardware provided in most RISC (reduced instruction set computer) workstations today. This implementation assumes that the host processor 11, 23 uses the hardware memory address unit 17 to implement the translation of virtual memory address spaces into the corresponding physical memory address spaces. In general, the MAU 17 can be thought of as an array of hardware registers 31 which are indexed by a portion of the virtual memory address. As shown in FIG. 3, the indexed register provides the page address ($A_n$ to $A_{12}$ in the example of FIG. 3) of the physical memory which the hardware combines with the remaining part of the virtual address ($A_{11}$–$A_0$ in the example) to form the physical memory address. Typically MAUs 17 operate with a page size of 4096 bytes which matches nicely with a DDB size of 4K, wherein each DDB occupies a full page. The DDB size can be adjusted to match the page size or multiple pages can be used for each DDB.

Figure 4A:
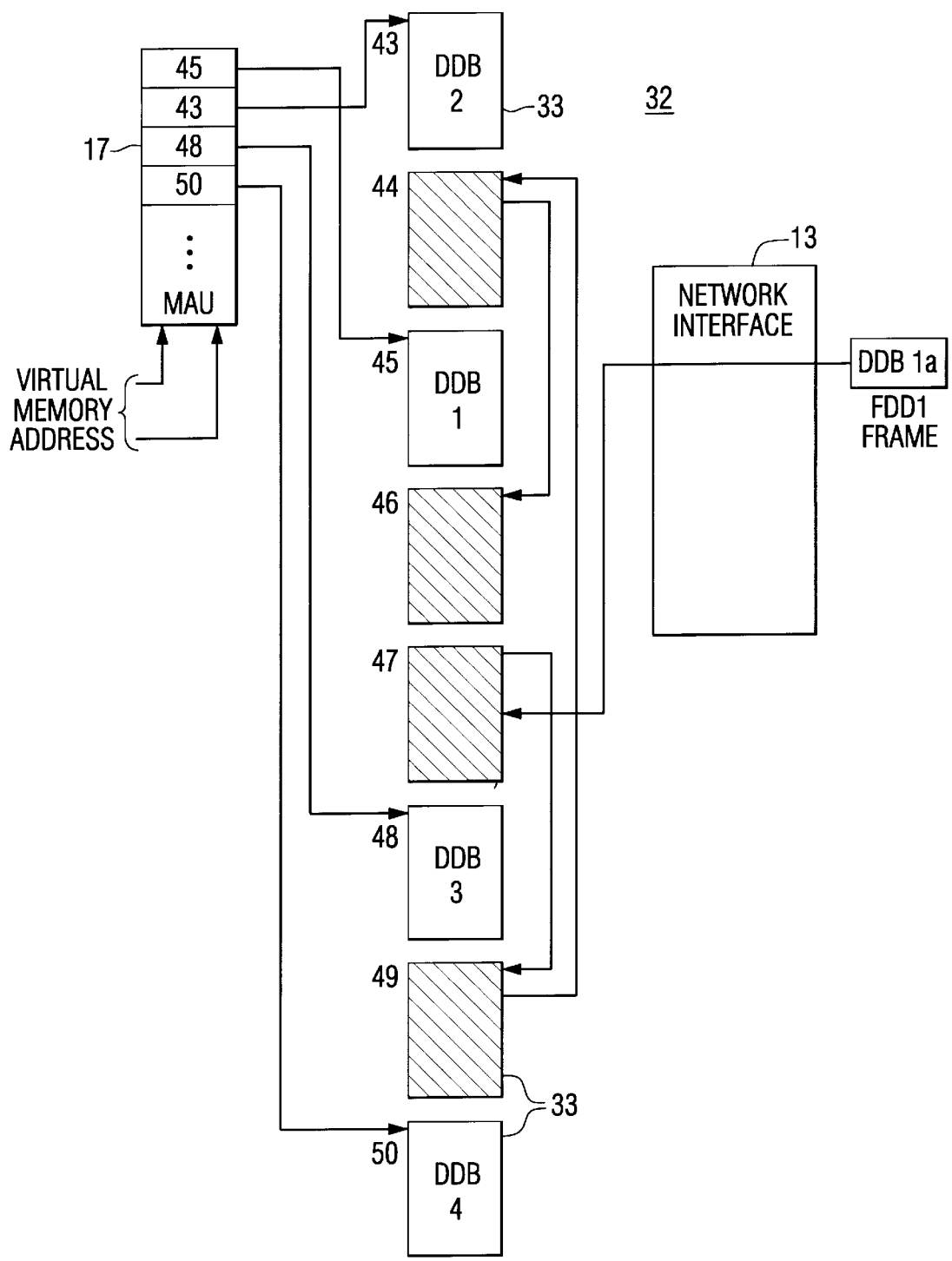
FIGS. 4A and 4B illustrate storing in a receiving station memory two successive images of a specific block of data transmitted by a network which forms part of the system.
Figure 4B:
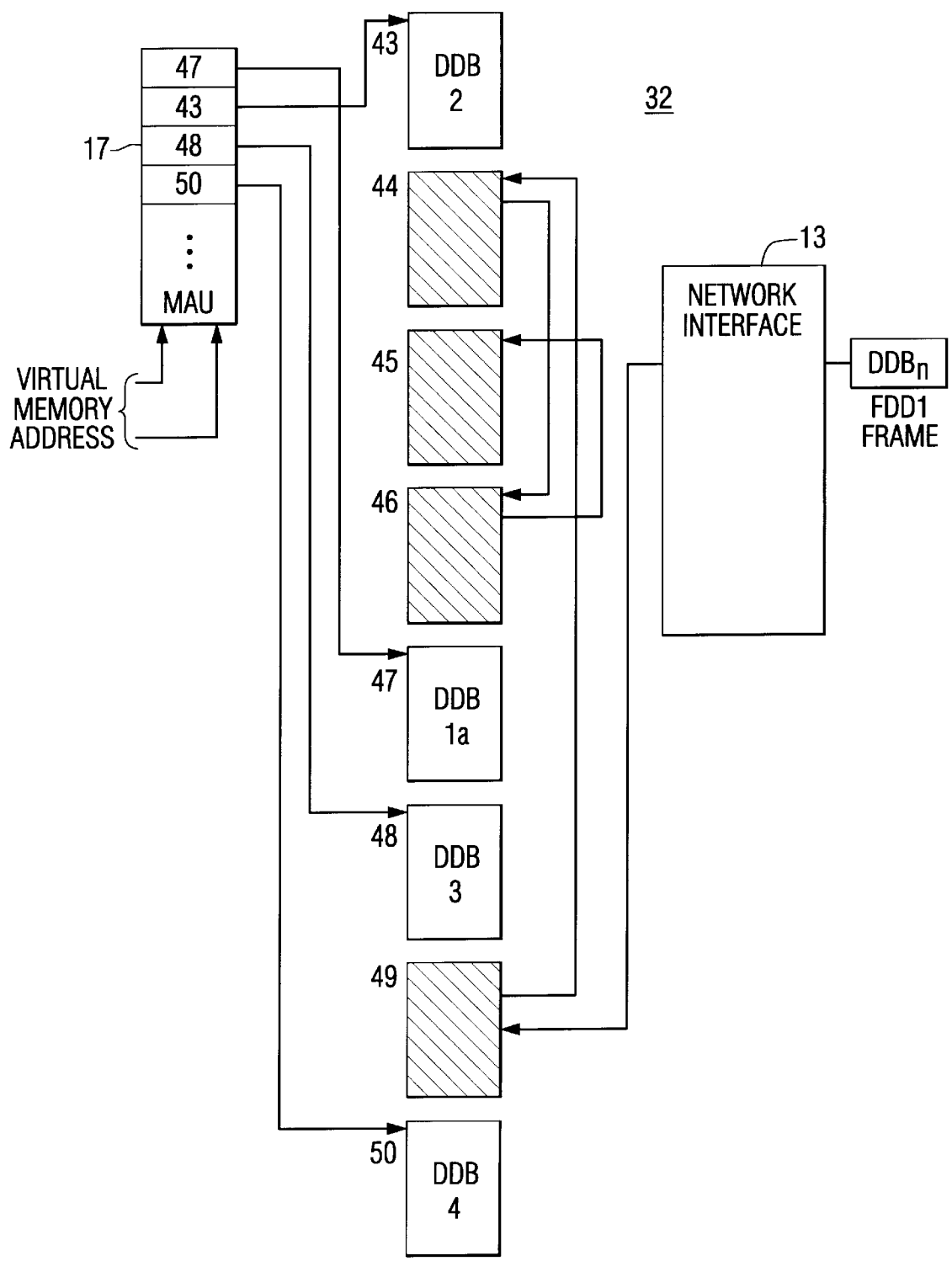

FIGS. 4A and 4B illustrates apparatus 32 and a process for implementing this aspect of the invention through an example in which four DDBs 1–4 are shown stored in pages 33 of the memory 15. For the state shown in FIG. 4A, the MAU 17 translates the virtual memory address for the latest image of the block of data DDB 1 to page 45 in the physical memory. The latest images of DDBs 2–4 are stored on pages 43, 48 and 50 respectively in physical memory. The network interface 13 maintains a list of available pages. In the example, those available pages are 47, 49, 44 and 46 in that order. When the next repetition of the first data block, DDB 1a, is received by the network interface in the form of an FDDI frame, the network interface 13 automatically stores that current image of the first DDB directly in page 47 of the memory, the first page on the list of available pages.

The network interface 13 then remaps the MAU 17 as shown in FIG. 4B to indicate that the most current image of the first data block, DDB 1a, is stored in page 47. As shown, page 45 is added to the end of the available buffer list and 49 moves to the top of the list. The next message image, DDBn, is then stored in page 49 as indicated in FIG. 4B Thus, the incoming data is stored in its entirety in the next available page in the memory 15. Minimum processing load is imposed on the network interface 13. No load is placed on the host processor except in instances where updating of the MAU registers 31 may require minimal action by the host processor.

Figure 5:
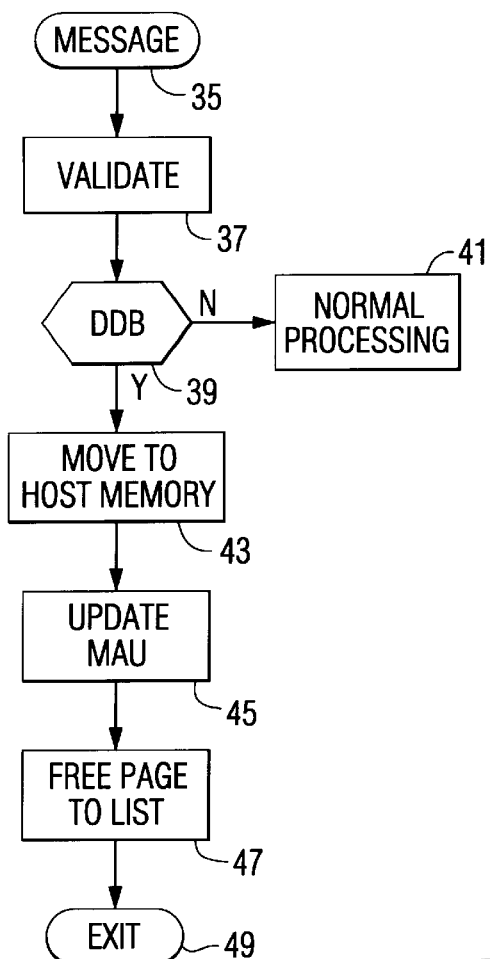
FIG. 5 is a flow chart for a computer program for a network interface at a receiving station which implements the process of FIGS. 4A and 4B.

FIG. 5 illustrates a flow chart of a suitable computer program run by the network interface 13 to implement the procedure illustrated in FIGS. 4A and 4B. As indicated at 35 in FIG. 5, the network interface 13 is activated by receipt of an FDDI frame. A check is made at 37 to verify the validity of the message. If the message is not a DDB as determined at 39, then the message is passed through at 41 to the standard FDDI protocol suite with no special handling.

If the message is a DDB as determined at 39, the entire frame is transferred into the first memory page at the head of the free buffer list, and that buffer is removed from the free list at 43. Using the DDB unique identification number from the received message, the corresponding MAU register 31 is updated at 45 to the newly received buffer.

The memory page which was removed from the MAU register is linked to the tail of the free page list at 47, and the network interface returns control to the host processor while waiting for the next FDDI frame at 49.

An alternative implementation 52 of the invention does not utilize the MAU 17; however, it does impact the performance of the host processor, 11, 23. In this implementation 52, which is illustrated by example in FIGS. 6A and 6B, the reception of a new image of a DDB is controlled by the FDDI device driver routine resident in the host processor software. This FDDI device driver is required to maintain the list of free pages in a table 51 from which it selects the next available page. All application access to the data is made indirectly by obtaining the page base addressed from a table 53 which is indexed by the DDB number. The application process must then compute the appropriate shared memory address by combining the base address with the offset into the page. This computation must be performed for every read or write to the DDBS.

Figure 6A:
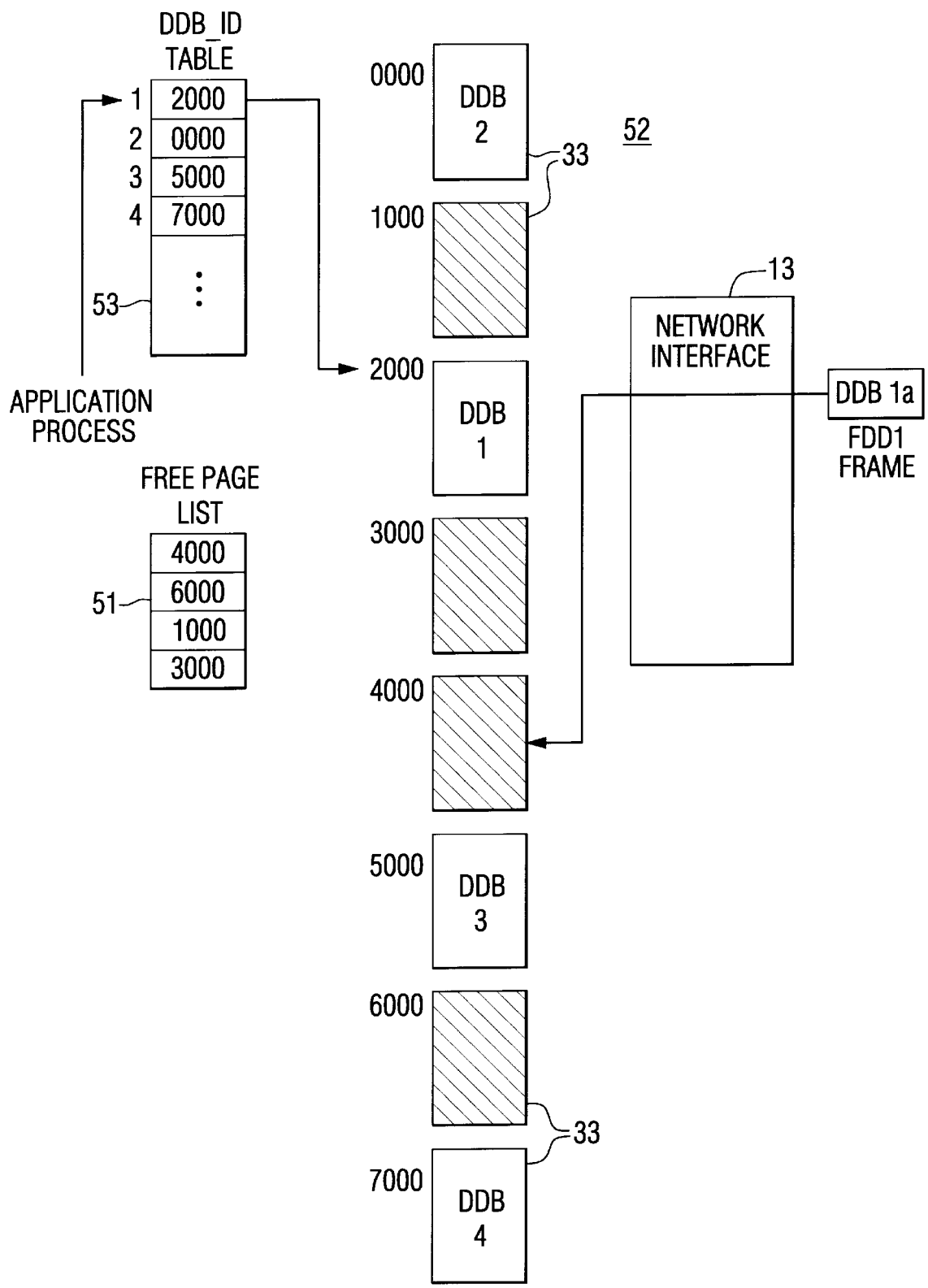
FIGS. 6A and 6B illustrate another embodiment of the invention for storing in a receiving station two successive images of a uniquely identified data block transmitted over the network.
Figure 6B:
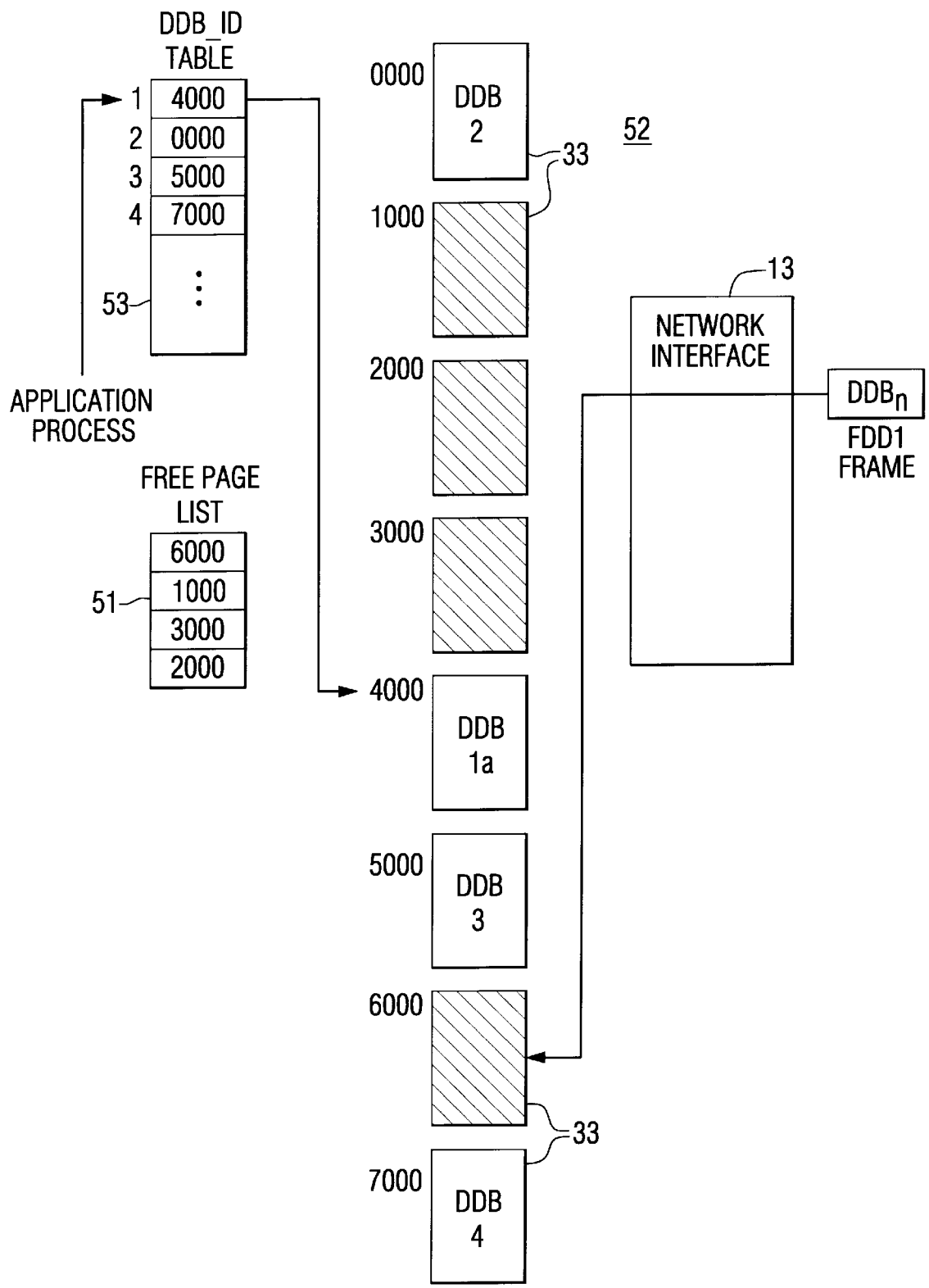

As shown in FIG. 6A. the network interface 13 receiving a new image, DDB 1a, of the first message stores it directly in shared memory at base address 400016, the first free page on the free page list 51. During this operation, an application process is accessing the data contained in the last image of the first message, DDB 1. This access is accomplished by indexing the DDBID table 53 to obtain the current base address (200016) computing the offset from this, and accessing a shared memory page 33 for the data. When the reception of DDB 1a is complete, the device driver must substitute the base address of the newly received DDB 1a image with the page in the DDBID table 53 index 1 as shown in FIG. 6B. Page $2000_{16}$, the address of the previous image, DDB 1, of the first message, is added to the bottom of the free page list 51. FIG. 6B also shows another message image, DDBn, being stored by the network interface 13 in page $6000_{16}$, the address which moved to the top of the free page list 51.

Figure 7:
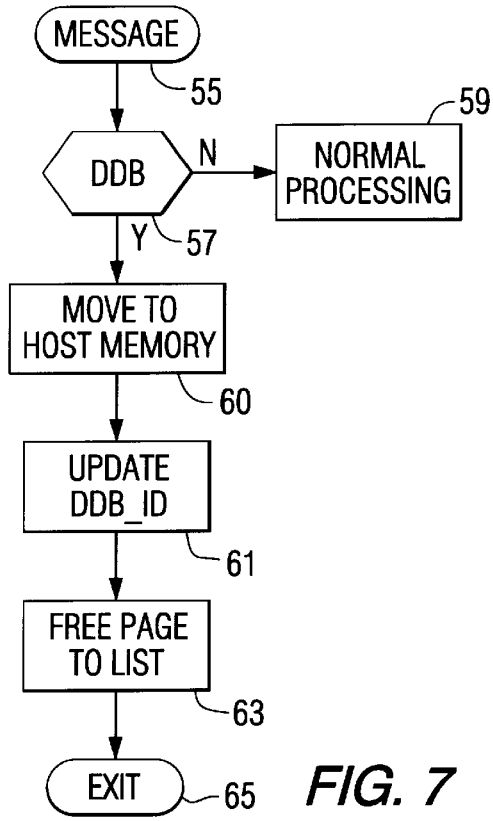
FIG. 7 is a flow chart for a suitable computer program for the station central processing unit which implements the process of FIGS. 6A and 6B.

FIG. 7 illustrates a flow chart of the host CPU in carrying out the above steps of the alternate embodiment of the invention. The driver software in the host CPU is activated by the receipt of a valid FDDI frame as indicated at 55. The validation is performed by the network interface 13. If the multi-cast address and the unique protocol identifier indicate at 57 that this is not a DDB packet, the non-DDB frame is passed through to the standard protocol suite with no special handling as indicated at 59.

If this is a DDB, as determined at 57, the entire frame is transferred into the memory page at the head of the free buffer list, and that buffer is removed from free list at 60. The contents of the DDBID table 53, at the location indexed by the DDBID field from the received frame, is changed to the address of the page where the frame was just stored as indicated at 61. The memory page which was replaced in the DDBID table 53 is linked to the tail of the free page list as indicated at 63. The routine then exits at 65 to wait for the next FDDI frame to reactivate the driver.

Figure 8:
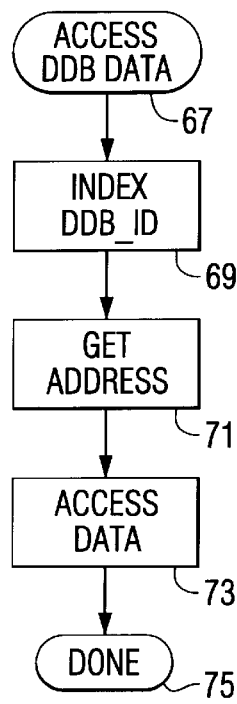
FIG. 8 is a flow chart for a suitable computer program for the station central processing unit for accessing data stored by the embodiment of FIGS. 6A, 6B and 7.

For the embodiment of the invention illustrated in FIGS. 6A–B, 7, the application software uses the routine shown in flow chart form in FIG. 8 to access the DDB contents. Hence, when the application program calls for access to DDB contents as indicated at 67, the DDB's unique ID is used to index the DDBID table 53 as indicated at 69. Using the address obtained from the DDBID table 51, the offset within that data block for the particular parameter value required by the application process is added to obtain the actual memory address as indicated at 71. The computer memory address is then accessed at 73 to obtain the required data which is returned to the application process at 75.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A real time data imaging network system comprising:
    a plurality of real time stations, each of said stations having memory means; and
    a broadcast communications network connecting said stations including means for repetitively transmitting at least one message from each of a plurality of said stations to each other of said stations said at least one message having a uniquely identified block of data with each repetition containing a current data image, said each other of said stations including means for receiving said at least one message and storing means for storing each repetition of said uniquely identified block of data in a same unique address space in said memory means, said each other of said stations also including means for alternatively receiving another message from one of said stations, with said other message having one of a TCP/IP protocol and a UDP/IP protocol.

2. The network system of claim 1 wherein each of said real time stations generates at least one uniquely identified block of data and wherein said communications network repetitively transmits each of said uniquely identified blocks of data from each of said stations to each other of said stations, and wherein said storing means in each of said stations stores each repetition of each uniquely identified block of data in a same address space in said memory means unique to that uniquely identified block of data.

3. The network of claim 2 wherein at least some of said stations generate first and second sets of uniquely identified blocks of data, and wherein said communications network repetitively transmits said first set of uniquely identified blocks of data at a first repetition rate and transmits said second set of uniquely identified blocks of data at a second slower repetition rate.

4. The network system of claim 2 wherein said same address spaces are unique virtual address spaces and wherein said storing means includes means translating said unique virtual address space for each uniquely identified block of data into a physical address space in said memory means in which a current repetition of said uniquely identified block of data is stored.

5. The network system of claim 2 wherein each station includes a central processing unit, wherein said unique address spaces are unique virtual address spaces and wherein said storing means include means maintaining a list of available physical address spaces in said memory means, means storing a uniquely identified block of data received over said communications network highway in a selected one of said available physical address spaces in said memory means, and means translating said virtual address space into the selected physical address space for access to said block of data by said central processing unit.

6. The network system of claim 5 wherein said means maintaining said list of available physical address spaces and said means storing a uniquely identified block of data in a selected physical address space are provided in a network interface and wherein said translating means is a memory address unit.

7. The network system of claim 5 wherein said means maintaining said list of available physical address spaces in said memory means and said means translating said virtual address space into said selected physical address space are provided in said central processing unit and wherein said means storing said uniquely identified block of data received over said communications network is a network interface.

8. The network system of claim 1 wherein said one protocol is encapsulated within an FDDI asynchronous message.

9. The network system of claim 1 wherein each of said uniquely identified blocks of data is part of an FDDI synchronous message.

10. The network system of claim 1 wherein said means for repetitively transmitting periodically broadcasts from said plurality of said stations to said each other of said stations.

11. A method of distributing data in a real time data imaging network system comprising: a plurality of real time stations, each of said stations containing a central processing unit, a memory and a network interface; and a communications network interconnecting said stations through said network interfaces, said method comprising the steps of:
    operating said central processing unit in each of said stations to repetitively assemble data into uniquely identified blocks of data containing a most recent data image;
    broadcasting each repetition of each uniquely identified block of data assembled by each of said stations over said communications network in a message to every other of said stations;

receiving said message and storing in said memory at each of said every other of said stations each repetition of each uniquely identified block of data received from other of said stations over said communications network in a same unique address space in said memory for each uniquely identified block of data;

employing another message having one of a TCP/IP and a UDP/IP protocol; and alternatively receiving said other message from one of said stations.

12. The method of claim 11 wherein said unique address spaces are unique virtual address spaces and wherein said storing step comprises:

storing each uniquely identified block of data received from other stations over said communications network in an available physical address space in said memory and translating said available physical address space into said unique virtual address space for that uniquely identified block of data.

13. The method of claim 12 including following translating the selected available address space into the unique virtual address space of the uniquely identified block of data stored at that physical address space, adding a physical address space at which a previous repetition of that uniquely identified block of data was stored to a list of available physical address spaces.

14. The method of claim 13 wherein said list of available physical address spaces is maintained in said network interface, wherein said network interface stores said uniquely identified blocks of data received over said communications network in said memory and wherein translating of said virtual address spaces into said selected physical address is accomplished by a memory address unit.

15. The method of claim 13 wherein said central processing unit at each station is programmed to maintain said list of available physical address spaces and to translate said virtual address space into said selected physical address space, and wherein said storing of said uniquely identified block of data received over said communications network in a selected physical address space is performed by said network interface means.

16. The method of claim 11 further comprising the step of:

encapsulating said one protocol within an FDDI asynchronous message.

17. The method of claim 11 further comprising the step of:

employing each of said uniquely identified blocks of data as part of an FDDI synchronous message.

18. A real time distributed process control system comprising:

a plurality of real time stations, each of said stations having memory means; and a real time broadcast communications network connecting said stations including means periodically transmitting at least one message from each of a plurality of said stations to each other of said stations said at least one message having a uniquely identified block of data with each periodic transmission containing a current data image, said each other of said stations including means for receiving said at least one message and storing means for storing each periodic transmission of said uniquely identified block of data in a same unique address space in said memory means, said each other of said stations also including means for alternatively receiving another message from one of said stations, with said other message having one of a TCP/IP protocol and a UDP/IP protocol.

19. The process control system of claim 18 wherein said one protocol is encapsulated within an FDDI asynchronous message; and wherein each of said uniquely identified blocks of data is part of an FDDI synchronous message.

* * * * *